US012123818B1

United States Patent
Lu et al.

(10) Patent No.: US 12,123,818 B1
(45) Date of Patent: Oct. 22, 2024

(54) METHOD FOR CORRECTING DIFFERENTIAL PRESSURE VALUES, DEVICE AND ANALYZER FOR ANALYZING CONCENTRATION THEREOF

(71) Applicant: UNIVERSITY OF SCIENCE AND TECHNOLOGY OF CHINA, Hefei (CN)

(72) Inventors: Song Lu, Hefei (CN); Hui Shi, Hefei (CN); Weitong Ma, Hefei (CN); Heping Zhang, Hefei (CN)

(73) Assignee: UNIVERSITY OF SCIENCE AND TECHNOLOGY OF CHINA, Hefei (CN)

( * ) Notice: Subject to any disclaimer, the term of this patent is extended or adjusted under 35 U.S.C. 154(b) by 0 days.

(21) Appl. No.: 18/656,603

(22) Filed: May 7, 2024

(30) Foreign Application Priority Data

Jul. 11, 2023 (CN) .......................... 202310843249.8

(51) Int. Cl.
*G01N 11/08* (2006.01)
*A62C 3/08* (2006.01)

(52) U.S. Cl.
CPC ................ *G01N 11/08* (2013.01); *A62C 3/08* (2013.01)

(58) Field of Classification Search
CPC ...... G01N 33/0006; G01N 7/00; G01N 11/08; G01N 11/04; G01N 11/02; G01N 33/007; A62C 99/0018; A62C 3/08; A62C 37/00
See application file for complete search history.

(56) References Cited

PUBLICATIONS

Forina, M., and C. Casolino. "improvement of slope-bias correction for the." Quimica Analitica 18 (1999): 49-59. (Year: 1999).*
Guan, Yu, et al. "A fast and easily-realized concentration sensor for binary gas mixtures and its design analysis." Sensors 18.4 (2018): 1257. (Year: 2018).*
Guan, Yu, et al. "Study of the response fluctuation variation for the extinguishing agent detection technique based on the differential pressure principle." Measurement 189 (2022): 110496. (Year: 2022).*
Guan, Yu, et al. "A study on gaseous extinguishing agent sensing with a simple measurement method." Measurement Science and Technology 29.3 (2018): 035105. (Year: 2018).*

(Continued)

*Primary Examiner* — Yoshihisa Ishizuka
*Assistant Examiner* — Carter W Ferrell
(74) *Attorney, Agent, or Firm* — Hemisphere Law, PLLC; Zhigang Ma (57) ABSTRACT

The invention discloses a method for correcting differential pressure values of a fire extinguishing agent concentration analyzer in the engine compartment of an aircraft, the analyzer, and a readable storage media thereof. The method includes: correcting theoretical differential pressure values of the analyzer; measuring actual differential pressure values of the analyzer under different pressure; obtaining a series of corrected viscosity coefficients accordingly; obtaining a relation accordingly; setting a corrected model to replace the original model of the analyzer. It is solved for the problem that the noise influence caused by the pressure of flight environment cannot be overcome in the test of extinguishing agent concentration in aircraft engine compartment.

7 Claims, 3 Drawing Sheets

(56) References Cited

PUBLICATIONS

Shi, Hui, et al. "Measurement of high-boiling point fire suppressant concentration using an improved differential pressure method." Measurement 191 (2022): 110818. (Year: 2022).*
Wright, John D. "What is the êbestê transfer standard for gas flow." Proceedings of Flomeko. National Institute of Standards and Technology, 2003. (Year: 2003).*
CNIPA, Notification of First Office Action for CN202310843249.8, Aug. 12, 2023.
CNIPA, Notification to grant patent right for invention in CN202310843249.8, Aug. 28, 2023.

* cited by examiner

METHOD FOR CORRECTING DIFFERENTIAL PRESSURE VALUES, DEVICE AND ANALYZER FOR ANALYZING CONCENTRATION THEREOF

FIELD OF THE INVENTION

The present invention relates to methods for correcting differential pressure values of analyzers for analyzing concentration of fire extinguishing agents, and more particularly to a method for correcting differential pressure values of a fire extinguishing agent concentration analyzer in the engine compartment of an aircraft, the analyzer, a device and a readable storage media thereof.

BACKGROUND OF THE INVENTION

The internal structure of the engine compartment of aircraft is complex. There are many combustible materials, and it is easy to cause the fire. The reliable performance of the gas fire extinguishing system is particularly important to ensure the flight safety. Once a fire occurs, the fire extinguishing agent sprayed in the fire area needs to reach the extinguishing concentration and maintain for a period of time to extinguish the fire and prevent the fire from reigniting. A large number of experiments in the industry have proposed methods and standards for the effectiveness verification of aircraft fire extinguishing systems in the AC20-100 advisory Circular. The criteria are all based on the concentration distribution of fire extinguishing agents in space. Therefore, the concentration distribution of fire extinguishing agents in space is an important index to evaluate the effectiveness of fire extinguishing and the rationality of fire extinguishing system design.

The technology for measuring concentration of the fire extinguishing agent, which is based on the principle of differential pressure, is the first measurement technology applied to the airworthiness verification of engine compartment fire extinguishing system. Now, it is relatively mature, and it has been formed and obtained the Federal Aviation Administration (FAA) certification of fire extinguishing agent concentration analyzer.

At present, the calibration and testing of the existing domestic fire extinguishing agent concentration analyzer is usually carried out in the ground atmospheric pressure environment, and the cabin pressure in the flight environment is about 60 kPa-101 kPa. In order to improve the adaptability of fire extinguishing agent concentration analyzer to low pressure environment and also to improve the test accuracy of high concentration, it is urgent to propose a differential pressure correction model and method, which is of great significance for airworthiness verification of aircraft gas fire extinguishing system.

SUMMARY OF THE INVENTION

The object of the present invention is to provide a method for correcting differential pressure values of an analyzer in the engine compartment of the aircraft, the analyzer being for analyzing concentration of fire extinguishing agent. The method is used to solve the problem that the concentration test of fire extinguishing agent in aircraft engine compartment cannot overcome the noise effect caused by flight environment pressure. Another object of the present invention is to provide the analyzer thereof. The third object of the present invention is to provide a readable storage media thereof.

The present invention provides a method for correcting differential pressure values of a fire extinguishing agent concentration analyzer in the engine compartment of an aircraft, the differential pressure value being obtained by the analyzer using a original model with related to the concentration of fire extinguishing agent and the differential pressure, the method including following steps.

Step 1, obtain a series of flow coefficients $C_d$ according to the mass flow-rates $Q_m$ of the fire extinguishing agent at the inlet of the analyzer under different pressures.

$$C_d = \frac{Q_m}{Q_{m0}}$$

$Q_{m0}$ means the theoretical mass flow-rates of the analyzer.

Step 2, correct theoretical differential pressure values $P_{d0}$ according to $C_d$, and obtaining corrected theoretical differential pressure values $P'_{d0}$ accordingly.

$$P'_{d0} = C_d \cdot P_{d0}$$

Step 3, measure actual differential pressure values $P_d$ of the analyzer under different pressure.

Step 4, obtain a series of corrected viscosity coefficients $C_\mu$ according to $P_d$ and $P'_{d0}$.

$$P_d = C_\mu \cdot P'_{d0}$$

Step 5, obtain a relation $C_\mu(x,P)$ by fitting different $C_\mu$ under different pressures and concentrations, $C_\mu(x,P)$ of $C_\mu$ is with regard to the pressure P and the volumetric concentration x of the fire extinguishing agent.

Step 6, set a corrected model $P_d(x,P)$ with regard to P and x to replace the original model.

$$P_d(x, P) = C_d C_\mu(x, P) \frac{32 d_0^2 l}{n d^4} \cdot \sqrt{T_0} \cdot \frac{\mu(x)\sqrt{\gamma(x) R_C / M(x)}}{\left(1 + \frac{\gamma(x)-1}{2}\right)^{\frac{\gamma(x)+1}{2(\gamma(x)-1)}}}$$

In the formula, $d_0$ means the aperture of the internal current limiting element of the analyzer. l means the length of the internal capillary of the analyzer. n means the total number of the capillary. $T_0$ means the stagnation temperature; $\mu(x)$ meaning the dynamic viscosity of the fire extinguishing agent about the volumetric concentration x. $\gamma(x)$ means the theoretical gas specific heat ratio about the volumetric concentration x. $M(x)$ means the theoretical molecular mass about the volumetric concentration x. $R_c$ means an universal gas constant.

$P_{d0}$ is shown as the following formula.

$$P_{d0} = \frac{32 d_0^2 l}{n d^4} \cdot \sqrt{T_0} \cdot \frac{\mu \sqrt{\gamma R_C / M}}{\left(1 + \frac{\gamma-1}{2}\right)^{\frac{\gamma+1}{2(\gamma-1)}}}$$

In the formula, $\mu$ means the theoretical dynamic viscosity of the fire extinguishing agent. $\gamma$ means the theoretical gas specific heat ratio. M means the theoretical molecular mass.

In the method for correcting differential pressure values of the present invention, and in step S6, following formulas are established if the pressure influence is ignored.

$$\gamma(x) = \frac{x c_{p1} + (1-x) c_{p2}}{x c_{p1} + (1-x) c_{p2} - R}$$

-continued $$M(x) = xM_1 + (1-x)M_2$$

$$\mu(x) = \frac{x\mu_1}{x+(1-x)\phi_{12}} + \frac{(1-x)\mu_2}{(1-x)+x\phi_{21}}$$

$$\phi_{12} = \frac{\left[1+\left(\frac{\mu_1}{\mu_2}\right)^{\frac{1}{2}}\left(\frac{M_2}{M_1}\right)^{\frac{1}{4}}\right]^2}{\left[8\left(1+\frac{M_1}{M_2}\right)\right]^{\frac{1}{2}}}$$

$$\phi_{21} = \frac{\mu_1}{\mu_2}\frac{M_1}{M_2}\phi_{12}$$

In the formula, $c_{p1}$ means the specific heat at constant pressure of the fire extinguishing agent with pure component. $c_{p2}$ means the specific heat at constant pressure of a carrier gas. R means the gas constant: $R_c/M$; $M_1$ meaning the molar mass of the fire extinguishing agent with pure component. $M_2$ means the molar mass of the carrier gas. $\mu_1$ means the dynamic viscosity of the fire extinguishing agent with pure component. $\mu_2$ means the dynamic viscosity of the carrier gas.

In the method for correcting differential pressure values of the present invention, and in step S5, the method for fitting $C_\mu(x,P)$ linearly includes following steps.

Fit $C_\mu$ linearly by relation curves with regard to $C_\mu$ and P of the fire extinguishing agent under different x.

$$C_\mu = a \cdot P + b$$

In the formula, a means the slope of $C_\mu$; b meaning the intercept of $C_\mu$.

Fit a(x) by relation curves with many a under different concentrations, and fit b(x) by relation curves with many b under different concentrations.

obtain $C_\mu(x,P)$ by different $C_\mu$ under different a(x) and b(x).

$$C_\mu(x,P) = a(x) \cdot P + b(x)$$

In the method for correcting differential pressure values of the present invention, $Q_{m0}$ is shown as a following formula.

$$Q_{m0} = \frac{\pi d_0^2}{4} \frac{P_0}{\sqrt{T_0}} \sqrt{\frac{\gamma M}{R_C}} \frac{1}{\left(1+\frac{\gamma-1}{2}\right)^{\frac{(\gamma+1)}{2(\gamma-1)}}}$$

In the formula, $P_0$ means the stagnation pressure.

In the method for correcting differential pressure values of the present invention, $P_0$ means the pressure of the fire extinguishing agent at the entrance of the analyzer, $T_0$ means the gas flow temperature.

In the method for correcting differential pressure values of the present invention, the analyzer uses a standard gas prepared by the gravimetric method, the standard gas is a binary-component gas mixed by the carrier gas and the fire extinguishing agent with pure component, the carrier gas is air or nitrogen.

The present invention further provides a device for correcting differential pressure values of a fire extinguishing agent concentration analyzer in the engine compartment of an aircraft by using any one method described above. The device includes a first obtaining unit, a correcting unit, a measuring unit, a second obtaining unit, a third obtaining unit, and a setting unit.

The first obtaining unit is used for obtaining a series of flow coefficients $C_d$ according to the mass flow-rates $Q_m$ of the fire extinguishing agent at the inlet of the analyzer under different pressures.

$$C_d = \frac{Q_m}{Q_{m0}}$$

$Q_{m0}$ means the theoretical mass flow-rates of the analyzer.

The correcting unit is used for correcting theoretical differential pressure values $P_{d0}$ according to $C_d$, and obtaining corrected theoretical differential pressure values $P'_{d0}$ accordingly.

$$P'_{d0} = C_d \cdot P_{d0}$$

The measuring unit is used for measuring actual differential pressure values $P_d$ by the analyzer under different pressure.

The second obtaining unit is used for obtaining a series of corrected viscosity coefficients $C_\mu$ according to $P_d$ and $P'_{d0}$.

$$P_d = C_\mu \cdot P'_{d0}$$

The third obtaining unit is used for obtaining a relation $C_\mu(x,P)$ by fitting different $C_\mu$ under different pressures and concentrations. $C_\mu(x,P)$ of $C_\mu$ is with regard to the pressure P and the volumetric concentration x of the fire extinguishing agent.

The setting unit is used for setting a corrected model $P_d(x,P)$ with regard to P and x to replace the original model.

$$P_d(x,P) = C_d C_\mu(x,P) \frac{32 d_0^2 l}{n d^4} \cdot \sqrt{T_0} \cdot \frac{\mu(x)\sqrt{\gamma(x)R_C/M(x)}}{\left(1+\frac{\gamma(x)-1}{2}\right)^{\frac{(\gamma(x)+1)}{2(\gamma(x)-1)}}}$$

In the formula, $d_0$ means the aperture of the internal current limiting element of the analyzer. l means the length of the internal capillary of the analyzer. n means the total number of the capillary. $T_0$ means the stagnation temperature. $\mu(x)$ means the dynamic viscosity of the fire extinguishing agent about the volumetric concentration x. $\gamma(x)$ means the theoretical gas specific heat ratio about the volumetric concentration x. M(x) means the theoretical molecular mass about the volumetric concentration x. $R_c$ means an universal gas constant.

$P_{d0}$ is shown as the following formula.

$$P_{d0} = \frac{32 d_0^2 l}{n d^4} \cdot \sqrt{T_0} \cdot \frac{\mu\sqrt{\gamma R_C/M}}{\left(1+\frac{\gamma-1}{2}\right)^{\frac{(\gamma+1)}{2(\gamma-1)}}}$$

In the formula, $\mu$ means the theoretical dynamic viscosity of the fire extinguishing agent. $\gamma$ means the theoretical gas specific heat ratio. M means the theoretical molecular mass.

The present invention further provides a analyzer for analyzing the fire extinguishing agent concentration. The analyzer is in the engine compartment of an aircraft, and uses any one method described above.

The present invention further provides a readable storage media with computer program instructions stored. One of the computer program instruction used to achieve functions according to any one method described above is read and run by a processor.

Compared with the prior art, the present invention has the following beneficial effects.

1. The pressure is involved in the construction of the model as a separate hidden factor variable. Depending on the adaptability of the model itself to pressure, the concentration test under different working pressures can be realized. Then the model has better universality.

2. Modified coefficients can be introduced to describe the complex effects of kinetic energy, gas expansion, gas non-ideality, wall slip and other factors to simplify the model.

DETAILED DESCRIPTION OF PREFERRED EMBODIMENTS

The present invention will now be described more specifically with reference to the following embodiments. It is to be noted that the following descriptions of preferred embodiments of this invention are presented herein for illustration and description only. It is not intended to be exhaustive or to be limited to the precise disclosed form.

It should be noted that when a component is said to be installed in another component, it can be directly on the other component or it can also exist in a resident component. When a component is considered to be set on another component, it may be set directly on the other component or there may also be a centered component. When a component is considered to be fixed to another component, it may be fixed directly to another component or there may also be a centered component.

Unless otherwise defined, all technical and scientific terms used herein have the same meaning as would normally be understood by a person skilled in the technical field belonging to the present invention. The terms used herein in the specification of the invention are for the purpose of describing specific embodiments only and are not intended to limit the invention. The term or/and as used herein includes any and all combinations of one or more related listed items.

The first embodiment of the present invention is as hereunder mentioned.

The fire extinguishing agent concentration analyzer of the present invention is mainly applied in the effectiveness verification test of the fire extinguishing system in the engine compartment of an aircraft, and is used to measure whether the fire extinguishing agent in the cabin can reach the fire extinguishing concentration and maintain it for a period of time, so as to extinguish the fire and prevent the fire from reignition. The analyzer adopts a modified model with related to the concentration of fire extinguishing agent and the differential pressure to replace the original model correspondingly. Then it is obtained for the measured fire extinguishing agent concentration according to the measured differential pressure and fire extinguishing agent pressure. It is solved for the traditional problem that the noise influence caused by the flight environment pressure cannot be overcome.

The method for correcting differential pressure values of the present invention uses a model to get differential pressure values. The model is with related to the concentration of fire extinguishing agent and the differential pressure. The present invention is generally directed to the form of software applied in the computer terminal. The software can be designed as an independent APP, or embedded software and so on. The computer terminal can be the controller of the fire extinguishing agent concentration analyzer of the invention, namely the CPU. The computer terminal can includes a memory, a processor, and a computer program. The computer program is stored on the memory and can be run on the processor. The computer terminal also can be smart phones, tablets, laptops, etc. capable of executing programs. In some embodiments the processor may be a Central Processing Unit (CPU), a controller, a microcontroller, a microprocessor, or other data processing chip. This processor is typically used to control the overall operation of computer equipment. In the present embodiment, the processors are used to run program code stored in memory or to process data. When the program is executed by the processor, the function of the method can be realized.

In application, the method of the present invention can also be designed as a readable storage medium, such as the U-shield. The computer program instructions are stored in the readable storage medium. When the computer program instructions are read and run by a processor, the method of the analyzer is executed. In the form of U-shield, it can be plugged into the traditional extinguishing agent concentration analyzer by electronic plugging. The analyzer in the aircraft engine compartment can accurately measure the extinguishing agent concentration when the aircraft is flying by reading and executing the computer program instructions in the U-shield, and solve the traditional technical problem that the noise influence caused by the flight environment pressure cannot be overcome. Therefore, the upgrade and transformation of the traditional aircraft engine compartment fire extinguishing agent concentration analyzer is realized by means of U-shield, which is conducive to the promotion and application of the invention.

Whether it is non-embedded or embedded, it can be summarized as a correction device for the differential pressure value of the corresponding extinguishing agent concentration analyzer. The device includes a first obtaining unit, a correcting unit, a measuring unit, a second obtaining unit, a third obtaining unit and a setting unit.

Figure 1:
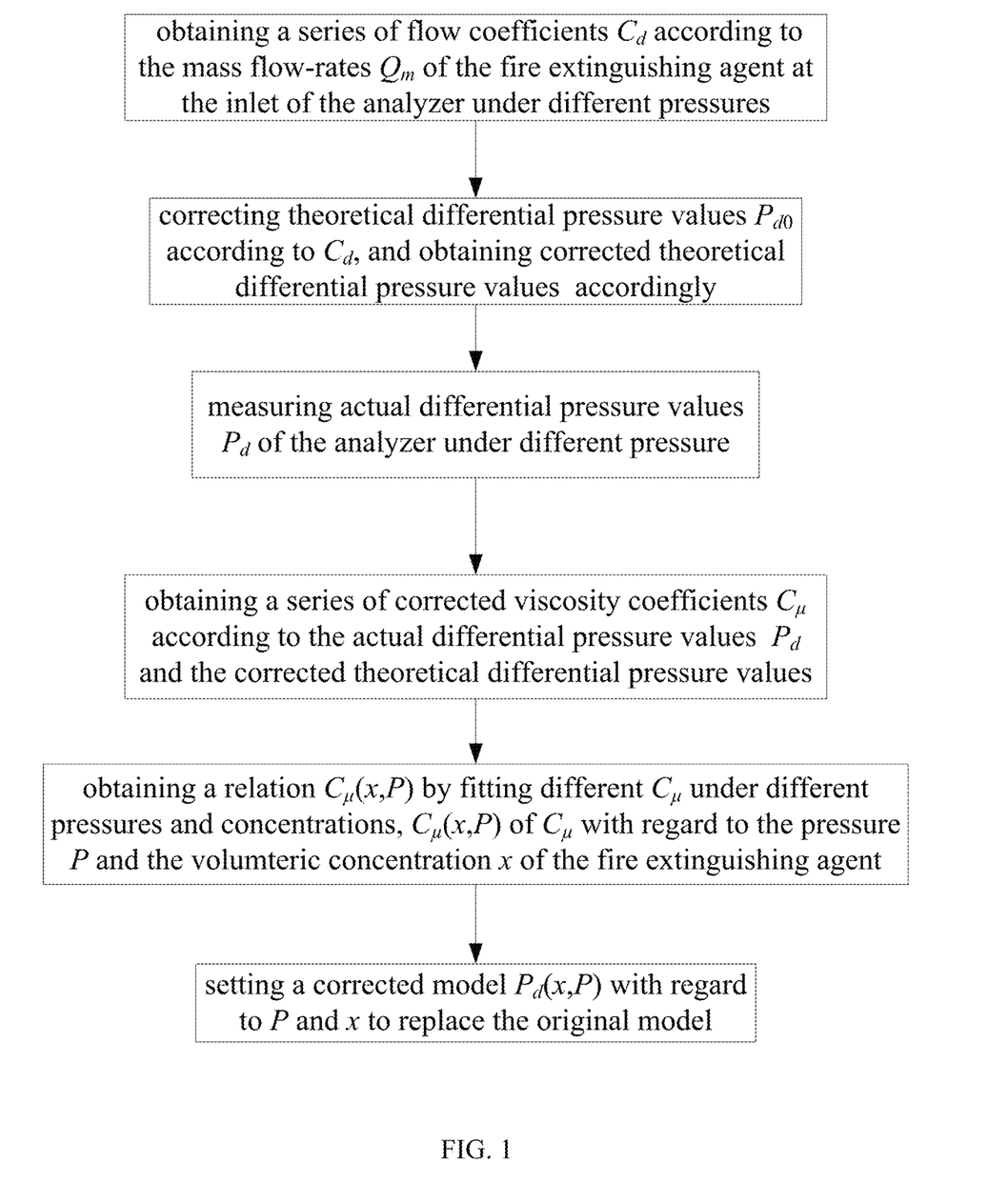
FIG. 1 is a flow diagram of a method for correcting differential pressure values of a fire extinguishing agent concentration analyzer, according to the first embodiment of the present invention.

The model with related to the concentration of fire extinguishing agent and the differential pressure is obtained by a method for correcting differential pressure values. Referring to FIG. 1, The method includes following steps: step 1 to step 6.

Step 1, obtain a series of flow coefficients $C_d$ according to the mass flow-rates $Q_m$ of the fire extinguishing agent at the inlet of the analyzer under different pressures.

$$C_d = \frac{Q_m}{Q_{m0}}$$

$Q_{m0}$ means the theoretical mass flow-rates of the analyzer.

Figure 2:
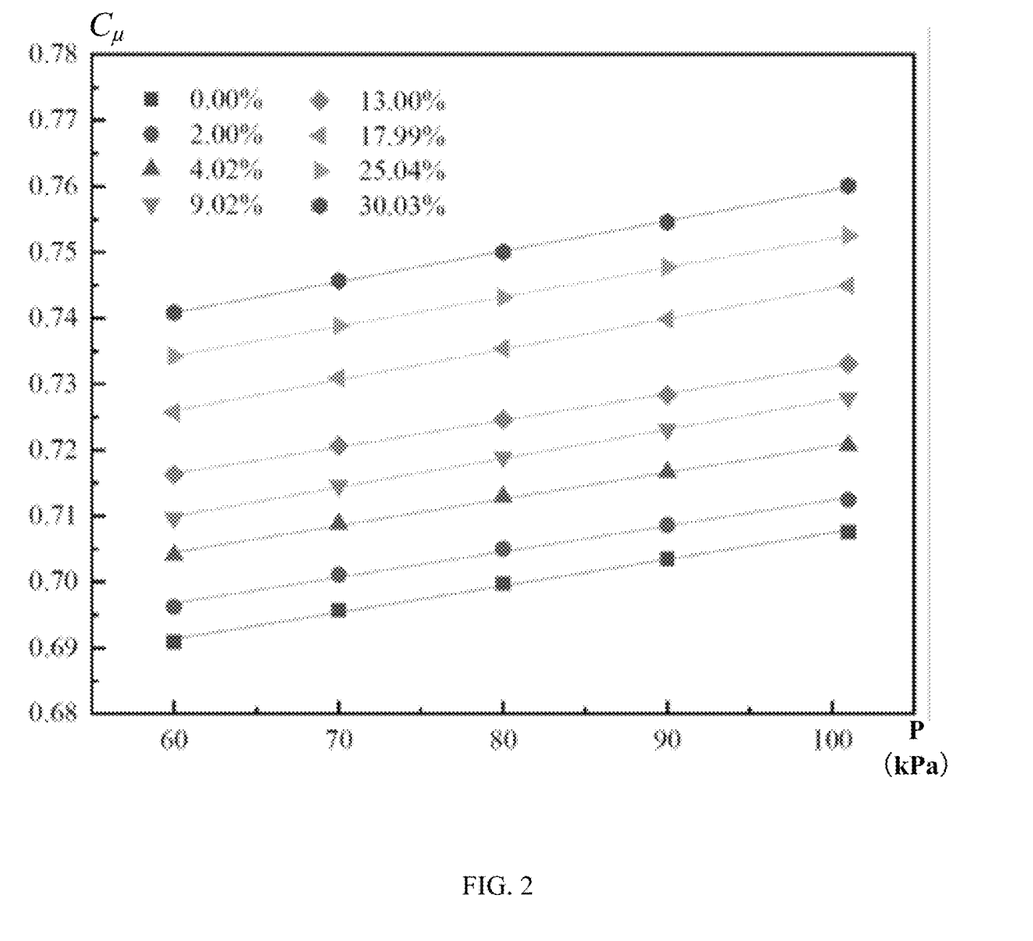
FIG. 2 is a graph of relation with flow coefficients $C_d$ under different concentrations and corresponding pressures, according to the first embodiment of the present invention.

The step 1 can be executed by the first obtaining unit. A graph of relation with flow coefficients $C_d$ under different concentrations and corresponding pressures is shown in FIG. 2.

The theoretical mass flow-rates $Q_{m0}$ can be calculated by a theoretical model combined with the internal geometry of the extinguishing agent concentration analyzer, gas concentration, air pressure at the inlet, air temperature and related gas property parameters. The theoretical model is with related to the concentration of fire extinguishing agent and the differential pressure. The there are many ways to obtain $Q_{m0}$. In the present embodiment, $Q_{m0}$ is shown as following formula.

$$Q_{m0} = \frac{\pi d_0^2}{4} \cdot \frac{P_0}{\sqrt{T_0}} \sqrt{\frac{\gamma M}{R_C}} \frac{1}{\left(1 + \frac{\gamma-1}{2}\right)^{\frac{(\gamma+1)}{2(\gamma-1)}}}$$

In the formula, $P_0$ means the stagnation pressure, approximate to the pressure of the fire extinguishing agent at the entrance of the analyzer.

$T_0$ means the stagnation temperature, approximate to the gas flow temperature.

$d_0$ means the aperture of the internal current limiting element of the analyzer.

$\gamma$ means the theoretical gas specific heat ratio.

M means the theoretical molecular mass.

$R_c$ means an universal gas constant.

Step 2, correct theoretical differential pressure values $P_{d0}$ according to $C_d$, and obtaining corrected theoretical differential pressure values $P'_{d0}$ accordingly.

$$P'_{d0} = C_d \cdot P_{d0}$$

The step 2 can be executed by the correcting unit.

In the present embodiment, $P_{d0}$ is shown as following formula.

$$P_{d0} = \frac{32 d_0^2 l}{n d^4} \cdot \sqrt{T_0} \cdot \frac{\mu \sqrt{\gamma R_C / M}}{\left(1 + \frac{\gamma-1}{2}\right)^{\frac{(\gamma+1)}{2(\gamma-1)}}}$$

In the formula, l means the length of the internal capillary of the analyzer.

n means the total number of the capillary.

d means the inner diameter of the capillary.

μ means the theoretical dynamic viscosity of the fire extinguishing agent.

Step 3, measure actual differential pressure values $P_d$ of the analyzer under different pressure. The step 3 can be executed by the measuring unit. It is only necessary to receive the corresponding measurement results from the extinguishing agent concentration analyzer at the time of execution.

Step 4, obtain a series of corrected viscosity coefficients $C_\mu$ according to $P_d$ and $P'_{d0}$.

$$P_d = C_\mu \cdot P'_{d0}$$

The step 4 can be executed by the second obtaining unit. In the present embodiment, the second obtaining unit can be a multiplier.

Step 5, obtain a relation $C_\mu(x,P)$ by fitting different $C_\mu$ under different pressures and concentrations. $C_\mu(x,P)$ of $C_\mu$, is with regard to the pressure P and the volumetric concentration x of the fire extinguishing agent.

The step 5 can be executed by the third obtaining unit.

There are many ways for fitting $C_\mu(x,P)$. Then various forms of curve function can be adopted. In the present embodiment, linear fitting is adopted. The method for fitting $C_\mu(x,P)$ linearly includes following steps.

(1) Fitting $C_\mu$ linearly by relation curves with regard to $C_\mu$ and P of the fire extinguishing agent under different x.

$$C_\mu = a \cdot P + b$$

In the formula, a means the slope of $C_\mu$ and b means the intercept of $C_\mu$.

(2) fit a(x) by relation curves with many a under different concentrations, and fit b(x) by relation curves with many b under different concentrations.

(3) obtain $C_\mu(x,P)$ by different $C_\mu$ under different a(x) and b(x).

$$C_\mu(x,P) = a(x) \cdot P + b(x)$$

Step 6, set a corrected model $P_d(x,P)$ with regard to P and x to replace the original model.

$$P_d(x, P) = C_d C_\mu(x, P) \frac{32 d_0^2 l}{n d^4} \cdot \sqrt{T_0} \cdot \frac{\mu(x) \sqrt{\gamma(x) R_C / M(x)}}{\left(1 + \frac{\gamma(x)-1}{2}\right)^{\frac{(\gamma(x)+1)}{2(\gamma(x)-1)}}}$$

In the formula, μ(x) means the dynamic viscosity of the fire extinguishing agent about the volumetric concentration x.

γ(x) means the theoretical gas specific heat ratio about the volumetric concentration x.

M(x) means the theoretical molecular mass about the volumetric concentration x.

The step 6 can be executed by the setting unit.

Following formulas are established if the pressure influence is ignored.

$$\gamma(x) = \frac{x c_{p1} + (1-x) c_{p2}}{x c_{p1} + (1-x) c_{p2} - R}$$

$$M(x) = x M_1 + (1-x) M_2$$

$$\mu(x) = \frac{x \mu_1}{x + (1-x) \phi_{12}} + \frac{(1-x) \mu_2}{(1-x) + x \phi_{21}}$$

$$\phi_{12} = \frac{\left[1 + \left(\frac{\mu_1}{\mu_2}\right)^{\frac{1}{2}} \left(\frac{M_2}{M_1}\right)^{\frac{1}{4}}\right]^2}{\left[8\left(1 + \frac{M_2}{M_1}\right)\right]^{\frac{1}{2}}}$$

$$\phi_{21} = \frac{\mu_1}{\mu_2} \frac{M_2}{M_1} \phi_{12}$$

In the formula, $c_{p1}$ means the specific heat at constant pressure of the fire extinguishing agent with pure component. $c_{p2}$ means the specific heat at constant pressure of a carrier gas. R means the gas constant, $R_c/M$. $M_1$ means the molar mass of the fire extinguishing agent with pure component. $M_2$ means the molar mass of the carrier gas. $\mu_1$ means the dynamic viscosity of the fire extinguishing agent with pure component. $\mu_2$ means the dynamic viscosity of the carrier gas.

Aiming at the problem that the analyzer based on the pressure difference principle is limited to normal pressure calibration and testing. The present invention discloses a method for correcting the differential pressure value of the analyzer, which mainly includes preparing a series of measured fire extinguishing agents with the same temperature and different pressures, and feeding them into the analyzer respectively. The mass flow rate of the air at the inlet was measured against the differential pressure generated by the laminar flow structure of the fire extinguishing agent concentration analyzer, and compared with the theoretical mass flow rate and theoretical differential pressure value obtained based on the theoretical model of fire extinguishing agent concentration-differential pressure. The flow coefficient and laminar viscosity correction coefficient were introduced to explain the differences between the theory and the experiment, and finally The corrected model of the coupled pressure was established. Fixed the effect of low pressure environment on concentration test.

The second embodiment of the present invention is as hereunder mentioned.

The second embodiment is basically the same as the first embodiment, except that all the steps before and after the corrected model establishment are introduced in detail in the second embodiment. Please referring to FIG. 3, the method for establishing the corrected model includes following steps.

Figure 3:
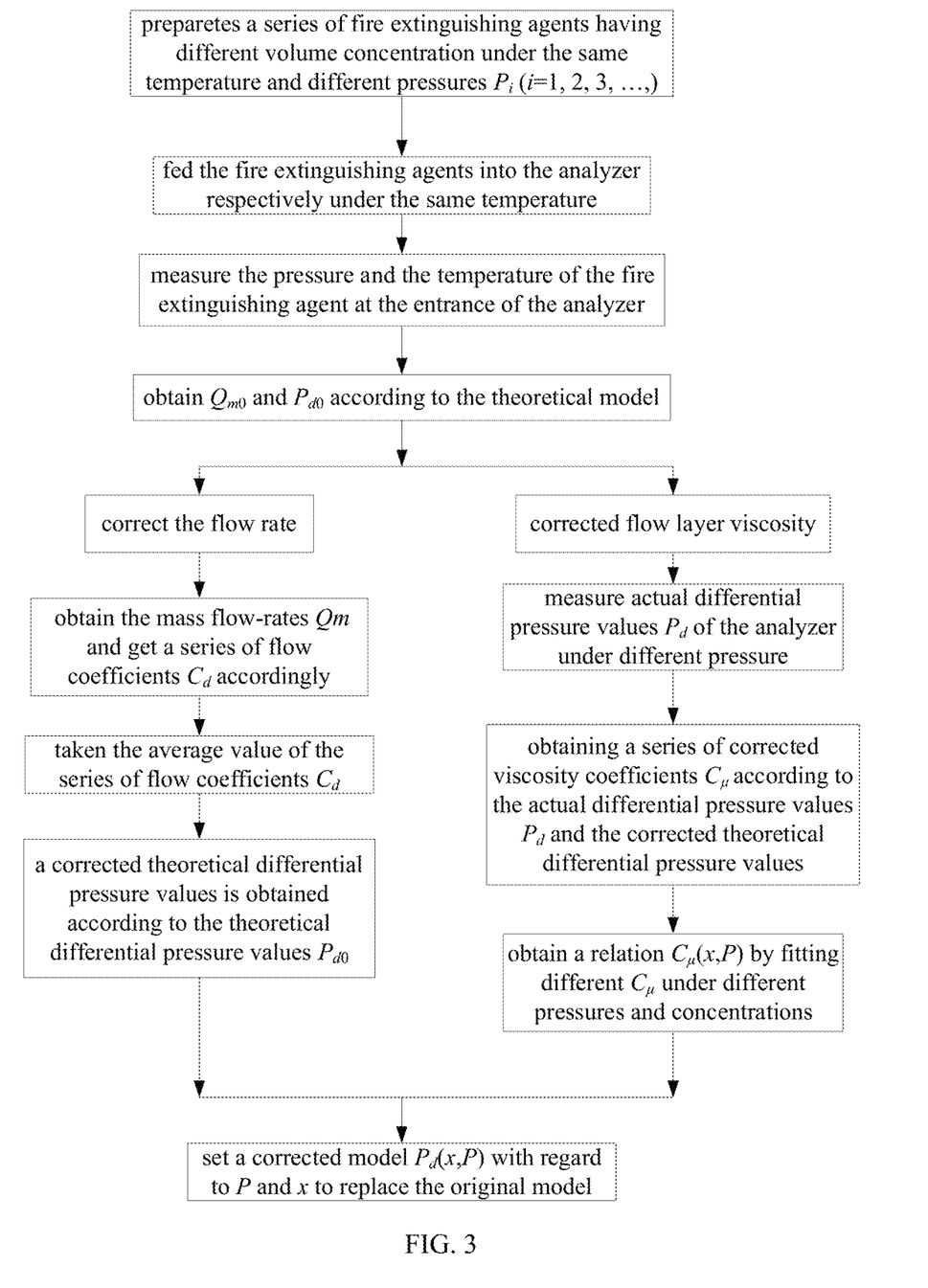
FIG. 3 is a flow diagram of a method for setting the model with related to the concentration of fire extinguishing agent and the differential pressure, according to the second embodiment of the present invention.

Step S1, prepare a series of fire extinguishing agents having different volume concentration under the same temperature and different pressures $P_i$ (i=1, 2, 3, . . . ). The analyzer uses a standard gas prepared by the gravimetric method. The standard gas is a binary-component gas mixed by the carrier gas and the fire extinguishing agent with pure component. The carrier gas is air or nitrogen.

Step S2, fed the fire extinguishing agents into the analyzer respectively under the same temperature.

Step S3, measure the pressure and the temperature of the fire extinguishing agent at the entrance of the analyzer.

Step S4, obtain $Q_{m0}$ and $P_{d0}$ combined with the internal geometry of the extinguishing agent concentration analyzer, gas concentration, air pressure at the inlet, air temperature and related gas property parameters, according to the theoretical model.

$$Q_{m0} = \frac{\pi d_0^2}{4} \frac{P_0}{\sqrt{T_0}} \sqrt{\frac{\gamma M}{R_C}} \frac{1}{\left(1 + \frac{\gamma-1}{2}\right)^{\frac{(\gamma+1)}{2(\gamma-1)}}}$$

$$P_{d0} = \frac{32 d_0^2 l}{n d^4} \cdot \sqrt{T_0} \cdot \frac{\mu \sqrt{\gamma R_C / M}}{\left(1 + \frac{\gamma-1}{2}\right)^{\frac{(\gamma+1)}{2(\gamma-1)}}}$$

In the formula, $d_0$ means the aperture of the internal current limiting element of the analyzer. $P_0$ means the stagnation pressure. In the present embodiment, $P_0$ means the pressure of the fire extinguishing agent at the entrance of the analyzer. $T_0$ means the stagnation temperature. In the present embodiment, $T_0$ means the gas flow temperature. $\gamma$ means the theoretical gas specific heat ratio. M means the theoretical molecular mass. $R_c$ means an universal gas constant. l means the length of the internal capillary of the analyzer. n means the total number of the capillary. $\mu$ means the dynamic viscosity of the fire extinguishing agent.

The parameters of gas properties are related to gas concentration, and the influence of pressure can be ignored. Then the parameters includes $\gamma(x)$, $M(x)$, $\mu(x)$.

$$\gamma(x) = \frac{x c_{p1} + (1-x) c_{p2}}{x c_{p1} + (1-x) c_{p2} - R}$$

$$M(x) = x M_1 + (1-x) M_2$$

$$\mu(x) = \frac{x \mu_1}{x + (1-x)\phi_{12}} + \frac{(1-x)\mu_2}{(1-x) + x\phi_{21}}$$

$$\phi_{12} = \frac{\left[1 + \left(\frac{\mu_1}{\mu_2}\right)^{\frac{1}{2}} \left(\frac{M_2}{M_1}\right)^{\frac{1}{4}}\right]^2}{\left[8\left(1 + \frac{M_2}{M_1}\right)\right]^{\frac{1}{2}}}$$

$$\phi_{21} = \frac{\mu_1}{\mu_2} \frac{M_2}{M_1} \phi_{12}$$

In the formula, R means the gas constant, $R_c/M$. x means the volumetric concentration of the fire extinguishing agent. $c_{p1}$ means the specific heat at constant pressure of the fire extinguishing agent with pure component. $c_{p2}$ means the specific heat at constant pressure of a carrier gas. $M_1$ means the molar mass of the fire extinguishing agent with pure component. $M_2$ means the molar mass of the carrier gas. $\mu_1$ means the dynamic viscosity of the fire extinguishing agent with pure component. $\mu_2$ means the dynamic viscosity of the carrier gas. The related gas properties of the dynamic viscosity and the carrier gas, such as specific heat capacity at constant pressure, molar mass, dynamic viscosity, etc., can be checked by some physical property parameter softwares.

Step S5, obtain the mass flow-rates $Q_m$ of the fire extinguishing agent at the inlet of the analyzer under different pressures. Compared the mass flow-rates $Q_m$ with the theoretical mass flow-rates $Q_{m0}$ to get a series of flow coefficients $C_d$.

$$C_d = \frac{Q_m}{Q_{m0}}$$

Step S6, The pressure and gas concentration have little effect on the flow coefficient $C_d$, which is mainly related to the internal current limiting structure of the fire extinguishing agent concentration analyzer, so the average value of the series of flow coefficients $C_d$ is taken. A corrected theoretical differential pressure values $P'_{d0}$ is obtained according to the theoretical differential pressure values $P_{d0}$.

$$P'_{d0} = C_d \cdot P_{d0}$$

Step S7, measure actual differential pressure values $P_d$ of the analyzer under different pressure.

Step S8, obtain a series of corrected viscosity coefficients $C_\mu$ according to $P_d$ and $P'_{d0}$.

$$P_d = C_\mu \cdot P'_{d0} = C_d C_\mu \frac{32 d_0^2 l}{n d^4} \cdot \sqrt{T_0} \cdot \frac{\mu \sqrt{\gamma R_C / M}}{\left(1 + \frac{\gamma-1}{2}\right)^{\frac{(\gamma+1)}{2(\gamma-1)}}}$$

Step S9, obtain a relation $C_\mu(x,P)$ by fitting different $C_\mu$ under different pressures and concentrations, $C_\mu(x,P)$ of $C_\mu$ with regard to the pressure P and the volumetric concentration x of the fire extinguishing agent.

The method for fitting $C_\mu(x,P)$ linearly includes following steps.

Step 9.1, fit $C_\mu$ linearly by relation curves with regard to $C_\mu$ and P of the fire extinguishing agent under different x.

$$C_\mu = a \cdot P + b$$

In the formula, $C_\mu$ means corrected viscosity coefficients. a means the slope of $C_\mu$. b means the intercept of $C_\mu$.

Step 9.2, fit a(x) by relation curves with many a under different concentrations, fit b(x) by relation curves with many b under different concentrations.

Step 9.3, obtain $C_\mu(x,P)$ by different $C_\mu$ under different a(x) and b(x) accordingly.

$$C_\mu(x,P) = a(x) \cdot P + b(x)$$

Step 10, set a corrected model $P_d(x,P)$ with regard to P and x to replace the original model.

$$P_d(x, P) = C_d C_\mu(x, P) \frac{32 d_0^2 l}{nd^4} \cdot \sqrt{T_0} \cdot \frac{\mu(x)\sqrt{\gamma(x) R_C / M(x)}}{\left(1 + \frac{\gamma(x)-1}{2}\right)^{\frac{(\gamma(x)+1)}{2(\gamma(x)-1)}}}$$

Compared with the prior art, the present invention has the following technical effects. The invention takes the pressure as the hidden factor variable of separation to participate in the establishment of the concentration-differential pressure model, and can rely on the adaptability of the model to the pressure to realize the concentration test under different working pressures, so that the established model has better versatility. At the same time, the modified coefficient is introduced to describe the complex effects of kinetic energy, gas expansion, gas non-ideality, wall slip and other factors to simplify the model.

The third embodiment of the present invention is as hereunder mentioned.

The third embodiment is an introduction to a specific practical operation of the second embodiment.

The entire flow chart of implementation steps is basically implemented in accordance with FIG. 1 of the second embodiment.

Step S1, prepare a series of Pentafluoroethane gas having different volume concentration (0%, 2%, 4.02%, 9.02%, 13%, 17.99%, 25.04%, 30.03%) under the same temperature (25° C.) and different pressures (60 kPa, 70 kPa, 80 kPa, 90 kPa, 101 kPa). The gravimetric method is used to prepare the series of Pentafluoroethane gas. The carrier gas is air or nitrogen.

Step S2, fed the fire extinguishing agents prepared under different pressure (60 kPa, 70 kPa, 80 kPa, 90 kPa, 101 kPa) into the analyzer respectively.

Step S3, measure the pressure and the temperature of the fire extinguishing agent at the entrance of the analyzer.

Step S4, obtain $Q_{m0}$ and $P_{d0}$ combined with the internal geometry of the extinguishing agent concentration analyzer, gas concentration, air pressure at the inlet, air temperature and related gas property parameters, according to the theoretical model.

$$Q_{m0} = \frac{\pi d_0^2}{4} \frac{P_0}{\sqrt{T_0}} \sqrt{\frac{\gamma M}{R_c}} \frac{1}{\left(1 + \frac{\gamma-1}{2}\right)^{\frac{(\gamma+1)}{2(\gamma-1)}}}$$

$$P_{d0} = \frac{32 d_0^2 l}{nd^4} \cdot \sqrt{T_0} \cdot \frac{\mu\sqrt{\gamma R_c / M}}{\left(1 + \frac{\gamma-1}{2}\right)^{\frac{(\gamma+1)}{2(\gamma-1)}}}$$

In the formula, $d_0$ means the aperture of the internal current limiting element of the analyzer. $P_0$ means the stagnation pressure. In the present embodiment, $P_0$ means the pressure of the fire extinguishing agent at the entrance of the analyzer. $T_0$ means the stagnation temperature. In the present embodiment, To means the gas flow temperature. $\gamma$ means the theoretical gas specific heat ratio. M means the theoretical molecular mass. $R_c$ means an universal gas constant. l means the length of the internal capillary of the analyzer. n means the total number of the capillary. d means the inner diameter of the capillary. $\mu$ means the dynamic viscosity of the fire extinguishing agent.

The parameters of gas properties are related to gas concentration, and the influence of pressure can be ignored. Then the parameters includes $\gamma(x)$, M(x), $\mu(x)$.

$$\gamma(x) = \frac{x c_{p1} + (1-x) c_{p2}}{x c_{p1} + (1-x) c_{p2} - R}$$

$$M(x) = x M_1 + (1-x) M_2$$

$$\mu(x) = \frac{x \mu_1}{x + (1-x)\phi_{12}} + \frac{(1-x)\mu_2}{(1-x) + x\phi_{21}}$$

$$\phi_{12} = \frac{\left[1 + \left(\frac{\mu_1}{\mu_2}\right)^{\frac{1}{2}} \left(\frac{M_2}{M_1}\right)^{\frac{1}{4}}\right]^2}{\left[8\left(1 + \frac{M_1}{M_2}\right)\right]^{\frac{1}{2}}}$$

$$\phi_{21} = \frac{\mu_2}{\mu_1} \frac{M_1}{M_2} \phi_{12}$$

In the formula, R means the gas constant, $R_c/M$. x means the volumetric concentration of the fire extinguishing agent. $c_{p1}$ means the specific heat at constant pressure of the fire extinguishing agent with pure component. $c_{p2}$ means the specific heat at constant pressure of a carrier gas. $M_1$ means the molar mass of the fire extinguishing agent with pure component. $M_2$ means the molar mass of the carrier gas. $\mu_1$ means the dynamic viscosity of the fire extinguishing agent with pure component. $\mu_2$ means the dynamic viscosity of the carrier gas.

Specifically, the specific heat capacity at constant pressure, molar mass and dynamic viscosity of pure component fire extinguishing agent and carrier gas at 25° C. were obtained by physical property parameter software, as shown in Table 1.

TABLE 1

| Gas type | Molar mass M (g/mol) | specific heat at constant pressure $c_p$ (J/(kg · K) | dynamic viscosity $\mu$ (Pa · s) |
|---|---|---|---|
| pentafluoroethane | 120.0214 | 796.51 | $1.296 \times 10^{-5}$ |
| air | 28.96 | 1006.6 | $1.849 \times 10^{-5}$ |

Step S5, obtain the mass flow-rates $Q_m$ of the fire extinguishing agent at the inlet of the analyzer under different pressures. Compared the mass flow-rates $Q_m$ with the theoretical mass flow-rates $Q_{m0}$ to get a series of flow coefficients $C_d$.

$$C_d = \frac{Q_m}{Q_{m0}}$$

Step S6, The pressure and gas concentration have little effect on the flow coefficient $C_d$, which is mainly related to the internal current limiting structure of the fire extinguishing agent concentration analyzer, so the average value 0.86 of the series of flow coefficients $C_d$ is taken. A corrected theoretical differential pressure values $P'_{d0}$ is obtained according to the theoretical differential pressure values $P_{d0}$.

$$P'_{d0} = C_d \cdot P_{d0}$$

Step S7, measure actual differential pressure values $P_d$ of the analyzer under different pressure.

Step S8, referring to FIG. 2 obtain a series of corrected viscosity coefficients $C_\mu$ according to $P_d$ and $P'_{d0}$.

$$P_d = C_\mu \cdot P'_{d0} = C_d C_\mu \frac{32 d_0^2 l}{n d^4} \cdot \sqrt{T_0} \cdot \frac{\mu \sqrt{\gamma R_c / M}}{\left(1 + \frac{\gamma - 1}{2}\right)^{\frac{(\gamma+1)}{2(\gamma-1)}}}$$

Step S9, obtain a relation $C_\mu(x,P)$ by fitting different $C_\mu$ under different pressures and concentrations, $C_\mu(x,P)$ of $C_\mu$ with regard to the pressure P and the volumetric concentration x of the fire extinguishing agent.

The method for fitting $C_\mu(x,P)$ linearly includes following steps.

Step 9.1, fit $C_\mu$ linearly by relation curves with regard to $C_\mu$ and P of the fire extinguishing agent under different x.

$$C_\mu = a \cdot P + b$$

In the formula, $C_\mu$ means corrected viscosity coefficients. a means the slope of $C_\mu$. b means the intercept of $C_\mu$.

Referring to table 2, slope, intercept values and fit $R^2$ under different pressures and different concentrations are shown.

TABLE 2

| concentration | slope $a_i$ | intercept $b_i$ | $R^2$ |
|---|---|---|---|
| 0% | $4.03 \times 10^{-4}$ | 0.6672 | 0.99673 |
| 2.00% | $3.90 \times 10^{-4}$ | 0.67339 | 0.99515 |
| 4.02% | $4.04 \times 10^{-4}$ | 0.68028 | 0.99740 |
| 9.02% | $4.42 \times 10^{-4}$ | 0.6834 | 0.99910 |
| 13.00% | $4.05 \times 10^{-4}$ | 0.69214 | 0.99936 |
| 17.99% | $4.63 \times 10^{-4}$ | 0.69823 | 0.99921 |
| 25.04% | $4.46 \times 10^{-4}$ | 0.70757 | 0.99989 |
| 30.03% | $4.66 \times 10^{-4}$ | 0.71286 | 0.99944 |

Through the above analysis, the concentration a has little effect on the slope, so the slope a is averaged as $4.27 \times 10^{-4}$. Then at a fixed slope, linear fitting was performed on the relationship between the above viscosity correction coefficient and pressure again, and the fitting parameters obtained were shown in Table 3.

TABLE 3

| concentration | slope $a_i$ | intercept $b_i$ | $R^2$ |
|---|---|---|---|
| 0% | $4.27 \times 10^{-4}$ | 0.66525 | 0.99310 |
| 2.00% | | 0.67044 | 0.98631 |
| 4.02% | | 0.67841 | 0.99405 |
| 9.02% | | 0.6846 | 0.99794 |
| 13.00% | | 0.69037 | 0.99638 |
| 17.99% | | 0.70114 | 0.99309 |
| 25.04% | | 0.70907 | 0.99813 |
| 30.03% | | 0.716 | 0.99240 |

Step 9.2, fit a(x) by relation curves with many a under different concentrations, fit b(x) by relation curves with many b under different concentrations.

$$b(x) = 0.66664 + 0.0022\, x - 1.91342\, x^2$$

Step 9.3, obtain $C_\mu(x,P)$ by different $C_\mu$ under different a(x) and b(x) accordingly.

$$C_\mu(x,P) = 4.27 \times 10^{-4} \cdot P + 0.66664 + 0.0022x - 1.91342\, x^2$$

Step 10, set a corrected model $P_d(x,P)$ with regard to P and x to replace the original model.

$$P_d(x, P) = C_d C_\mu(x, P) \frac{32 d_0^2 l}{n d^4} \cdot \sqrt{T_0} \cdot \frac{\mu(x) \sqrt{\gamma(x) R_c / M(x)}}{\left(1 + \frac{\gamma(x) - 1}{2}\right)^{\frac{(\gamma(x)+1)}{2(\gamma(x)-1)}}}$$

As the current calibration and testing of fire extinguishing agent concentration analyzer are limited to atmospheric pressure environment, and the impact of flight low pressure environment on concentration testing is unknown. The present invention adopts a relatively simplified method and introduces a correction factor to uniformly describe the complex effects brought by kinetic energy, gas expansion, gas non-ideal, wall slip and other factors. The concentration-differential pressure model of coupled pressure was constructed for the fire extinguishing agent concentration analyzer based on the principle of pressure difference. The influence of pressure on concentration test was corrected. The adaptability of the analyzer to the flight pressure variable environment was improved. The performance of the analyzer was optimized.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for correcting differential pressure values of a fire extinguishing agent concentration analyzer in an engine compartment of an aircraft, executed by a processor of a computer terminal, a differential pressure value being obtained by the analyzer using an original model related to a concentration of fire extinguishing agent and a differential pressure, the method comprising:

step 1, obtaining a series of flow coefficients Cd according to mass flow-rates $Q_m$ of the fire extinguishing agent at an inlet of the analyzer under different pressures:

$$C_d = \frac{Q_m}{Q_{m0}}$$

$Q_{m0}$ meaning theoretical mass flow-rates of the analyzer;

step 2, correcting theoretical differential pressure values $P_{d0}$ according to $C_d$, and obtaining corrected theoretical differential pressure values $P'_{d0}$ accordingly:

$$P'_{d0} = C_d \cdot P_{d0}$$

$$P_{d0} = \frac{32 d_0^2 l}{n d^4} \cdot \sqrt{T_0} \cdot \frac{\mu\sqrt{\gamma R_c/M}}{\left(1 + \frac{\gamma-1}{2}\right)^{\frac{(\gamma+1)}{2(\gamma-1)}}}$$

in the formula, μ meaning a theoretical dynamic viscosity of the fire extinguishing agent, γ meaning a theoretical gas specific heat ratio, M meaning a theoretical molecular mass;

step 3, measuring actual differential pressure values $P_d$ of the analyzer under different pressures;

step 4, obtaining a series of corrected viscosity coefficients $C_\mu$ according to $P_d$ and $P'_{d0}$:

$$P_d = C_\mu * P'_{d0}$$

step 5, obtaining a relation $C_\mu(x,P)$ by fitting the corrected viscosity coefficients $C_\mu$, $C_\mu(x,P)$ being a function of $C_\mu$ with regard to a pressure P and a volumetric concentration x of the fire extinguishing agent;

step 6, setting a corrected model $P_d(x,P)$ with regard to P and x to replace the original model:

$$P_d(x,P)^+ = C_d C_\mu(x,P) \frac{32 d_0^2 l}{n d^4} \cdot \sqrt{T_0} \cdot \frac{\mu(x)\sqrt{\gamma(x) R_c/M(x)}}{\left(1 + \frac{\gamma(x)-1}{2}\right)^{\frac{(\gamma(x)+1)}{2(\gamma(x)-1)}}}$$

In the formula, $d_0$ meaning an aperture of an internal current limiting element of the analyzer; d meaning an inner diameter of a capillary; l meaning a length of an internal capillary of the analyzer; n meaning a total number of the capillary; $T_0$ meaning a stagnation temperature; μ(x) meaning a dynamic viscosity of the fire extinguishing agent about the volumetric concentration x; γ(x) meaning a theoretical gas specific heat ratio about the volumetric concentration x; M(x) meaning a theoretical molecular mass about the volumetric concentration x; $R_c$ meaning a universal gas constant, wherein in the step 5, the method for fitting $C_\mu(x,P)$ linearly comprises:

fitting $C_\mu$ linearly by relation curves with regard to $C_\mu$ and P of the fire extinguishing agent under different x:

$$C_\mu = a \cdot P + b$$

in the formula, a meaning a slope of $C_\mu$; b meaning an intercept of $C_\mu$;

fitting a(x) by relation curves with many a under different concentrations, and fitting b(x) by relation curves with many b under different concentrations;

obtaining $C_\mu(x,P)$ by different C under different a(x) and b(x):

$$C_\mu(x,P) = a(x) \cdot P + b(x); \text{ and}$$

Step 7, correcting the differential pressure values using the corrected model $P_d(x,P)$.

2. The method for correcting differential pressure values according to claim 1, wherein in the step 6, following formulas are established if a pressure influence is ignored:

$$\gamma(x) = \frac{x c_{p1} + (1-x) c_{p2}}{x c_{p1} + (1-x) c_{p2} - R}$$

$$M(x) = x M_1 + (1-x) M_2$$

$$\mu(x) = \frac{x \mu_1}{x + (1-x)\phi_{12}} + \frac{(1-x)\mu_2}{(1-x) + x\phi_{21}}$$

$$\phi_{12} = \frac{\left[1 + \left(\frac{\mu_1}{\mu_2}\right)^{\frac{1}{2}}\left(\frac{M_2}{M_1}\right)^{\frac{1}{4}}\right]^2}{\left[8\left(1 + \frac{M_1}{M_2}\right)\right]^{\frac{1}{2}}}$$

$$\phi_{21} = \frac{\mu_2}{\mu_1}\frac{M_1}{M_2}\phi_{12}$$

in the formula, $c_{p1}$ meaning a specific heat at constant pressure of the fire extinguishing agent with pure component; $c_{p2}$ meaning a specific heat at constant pressure of a carrier gas; R meaning a gas constant, and $R = R_c/M$; $M_1$ meaning a molar mass of the fire extinguishing agent with pure component; $M_2$ meaning a molar mass of the carrier gas; $\mu_1$ meaning a dynamic viscosity of the fire extinguishing agent with pure component; $\mu_2$ meaning a dynamic viscosity of the carrier gas.

3. The method for correcting differential pressure values according to claim 1, wherein $Q_{m0}$ is shown as follow:

$$Q_{m0} = \frac{\pi d_0^2}{4} \frac{P_0}{\sqrt{T_0}} \sqrt{\frac{\gamma M}{R_c}} \frac{1}{\left(1 + \frac{\gamma-1}{2}\right)^{\frac{(\gamma+1)}{2(\gamma-1)}}}$$

in the formula, $P_0$ meaning a stagnation pressure.

4. The method for correcting differential pressure values according to claim 3, wherein $P_0$ means a pressure of the fire extinguishing agent at the entrance of the analyzer, $T_0$ means a gas flow temperature.

5. The method for correcting differential pressure values according to claim 1, wherein the analyzer uses a standard gas prepared by a gravimetric method, the standard gas is a binary-component gas mixed by a carrier gas and the fire extinguishing agent with pure component, the carrier gas is air or nitrogen.

6. A device for correcting differential pressure values of a fire extinguishing agent concentration analyzer in the engine compartment of an aircraft by using the method of claim 1, comprising:

a first obtaining unit, electrically connected with the processor, and used for obtaining a series of flow coefficients $C_d$ according to the mass flow-rates $Q_m$ of the fire extinguishing agent at the inlet of the analyzer under different pressures:

$$C_d = \frac{Q_m}{Q_{m0}}$$

$Q_{m0}$ meaning the theoretical mass flow-rates of the analyzer;

a correcting unit, electrically connected with the processor, and used for correcting theoretical differential pressure values $P_{d0}$ according to $C_d$, and obtaining corrected theoretical differential pressure values $P'_{d0}$ accordingly:

$$P'_{d0} = C_d \cdot P_{d0}$$

$$P_{d0} = \frac{32 d_0^2 l}{n d^4} \cdot \sqrt{T_0} \cdot \frac{\mu \sqrt{\gamma R_c / M}}{\left(1 + \frac{\gamma - 1}{2}\right)^{\frac{(\gamma+1)}{2(\gamma-1)}}}$$

in the formula, $\mu$ meaning the theoretical dynamic viscosity of the fire extinguishing agent, $\gamma$ meaning the theoretical gas specific heat ratio, M meaning the theoretical molecular mass;

a measuring unit, electrically connected with the processor, and used for measuring actual differential pressure values $P_d$ by the analyzer under different pressure pressures;

a second obtaining unit, electrically connected with the processor, and used for obtaining a series of corrected viscosity coefficients $C_\mu$ according to $P_d$ and $P'_{d0}$:

$$P_d = C_\mu \cdot P'_{d0}$$

a third obtaining unit, electrically connected with the processor, and used for obtaining a relation $C_\mu(x,P)$ by fitting the corrected viscosity coefficients $C_\mu$, $C_\mu(x,P)$ being a function of $C_\mu$ with regard to the pressure P and the volumetric concentration x of the fire extinguishing agent;

a setting unit, electrically connected with the processor, and used for setting a corrected model $P_d(x,P)$ with regard to P and x to replace the original model:

$$P_d(x, P) = C_d C_\mu(x, P) \frac{32 d_0^2 l}{n d^4} \cdot \sqrt{T_0} \cdot \frac{\mu(x) \sqrt{\gamma(x) R_c / M(x)}}{\left(1 + \frac{\gamma(x) - 1}{2}\right)^{\frac{(\gamma(x)+1)}{2(\gamma(x)-1)}}}$$

in the formula, $d_0$ meaning the aperture diameter of the internal current limiting element of the analyzer; l meaning the length of the internal capillary of the analyzer; n meaning the total number of the capillary; $T_0$ meaning the stagnation temperature; $\mu(x)$ meaning the dynamic viscosity of the fire extinguishing agent about the volumetric concentration x; $\gamma(x)$ meaning the theoretical gas specific heat ratio about the volumetric concentration x; M(x) meaning the theoretical molecular mass about the volumetric concentration x; $R_c$ meaning a universal gas constant.

7. An analyzer for analyzing the fire extinguishing agent concentration, in the engine compartment of an aircraft, and using the method of claim 1 for correcting its differential pressure values.

* * * * *